Jan. 3, 1961 L. P. SALTER, JR., ET AL 2,966,859
PUMP AND PACKING

Filed March 10, 1958 2 Sheets-Sheet 1

INVENTORS.
LESLIE P. SALTER JR.,
DOYLE E. THOMAS JR.,
BY Frank S. Troidl

ATTORNEY.

Jan. 3, 1961  L. P. SALTER, JR., ET AL  2,966,859
PUMP AND PACKING
Filed March 10, 1958  2 Sheets-Sheet 2
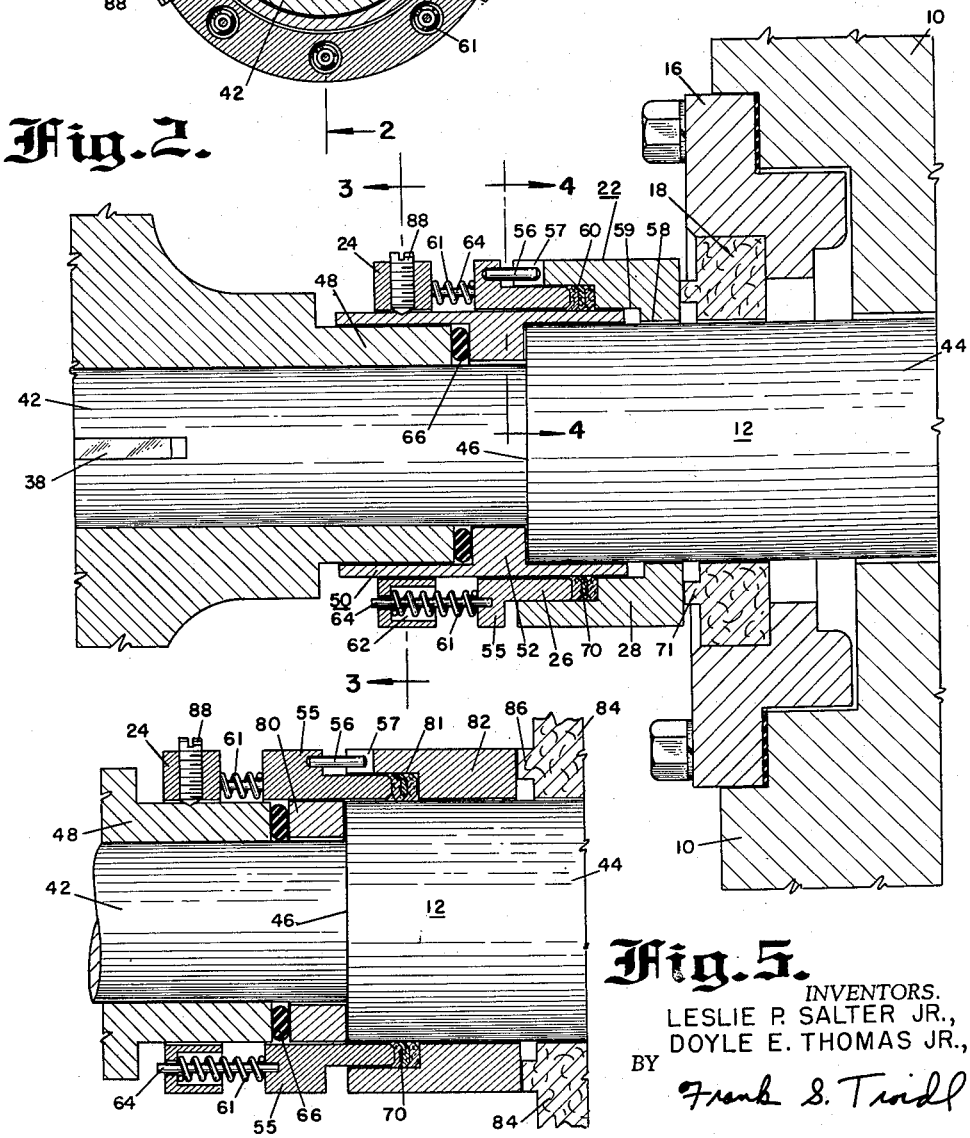
INVENTORS.
LESLIE P. SALTER JR.,
DOYLE E. THOMAS JR.,
BY Frank S. Troidl
ATTORNEY.

United States Patent Office 2,966,859
Patented Jan. 3, 1961

2,966,859

PUMP AND PACKING

Leslie P. Salter, Jr., and Doyle E. Thomas, Jr., Baytown, Tex., assignors, by mesne assignments, to Esso Research and Engineering Company, Elizabeth, N.J., a corporation of Delaware Filed Mar. 10, 1958, Ser. No. 720,244

3 Claims. (Cl. 103—111)

This invention relates to improvements in pumps and packing.

Briefly described, this invention includes a pump casing. A drive shaft having a circular shoulder located at a point within the pump casing extends into the casing. A spacer member and an impeller are mounted about the shaft. The spacer member abuts the circular shoulder. A rotatable mechanical seal member is mounted on the shaft. A stationary mechanical seal member is mounted on the pump casing. Means, axially movable with respect to the shaft, are used to compress the rotatable mechanical seal member into fluid tight contact with the stationary mechanical seal member.

The new pump and packing described herein has, among other things, the following advantages over currently utilized pumps and packing.

(1) The use of separately constructed parts for each individual pump is eliminated. Standard parts are available at local mechanical seal supply houses.

(2) The conversion from an unbalanced seal (low pressure) to balanced seals (high pressure), or vice versa, is simplified.

(3) Provision is made for the adjustment of the compression of the rotatable mechanical seal against the stationary mechanical seal. The compression can be adjusted to compensate for wear of the contacting seal faces, or can be properly set if machine work is necessary on the shaft, impeller, spacer, and so forth.

A further understanding of this invention, as well as its many advantages, may be had by reference to the following drawings and detailed description, in which:

Fig. 2 is an elevational view, partly in section, showing in detail the new packing as used in a balanced or high pressure pump;

Fig. 3 is a sectional view taken along lines 3—3 of Fig. 2;

Fig. 4 is a sectional view taken along lines 4—4 of Fig. 2; and

Fig. 5 is an elevational view, partly in section, showing the new packing as used with an unbalanced or low pressure pump.

Figure 1:
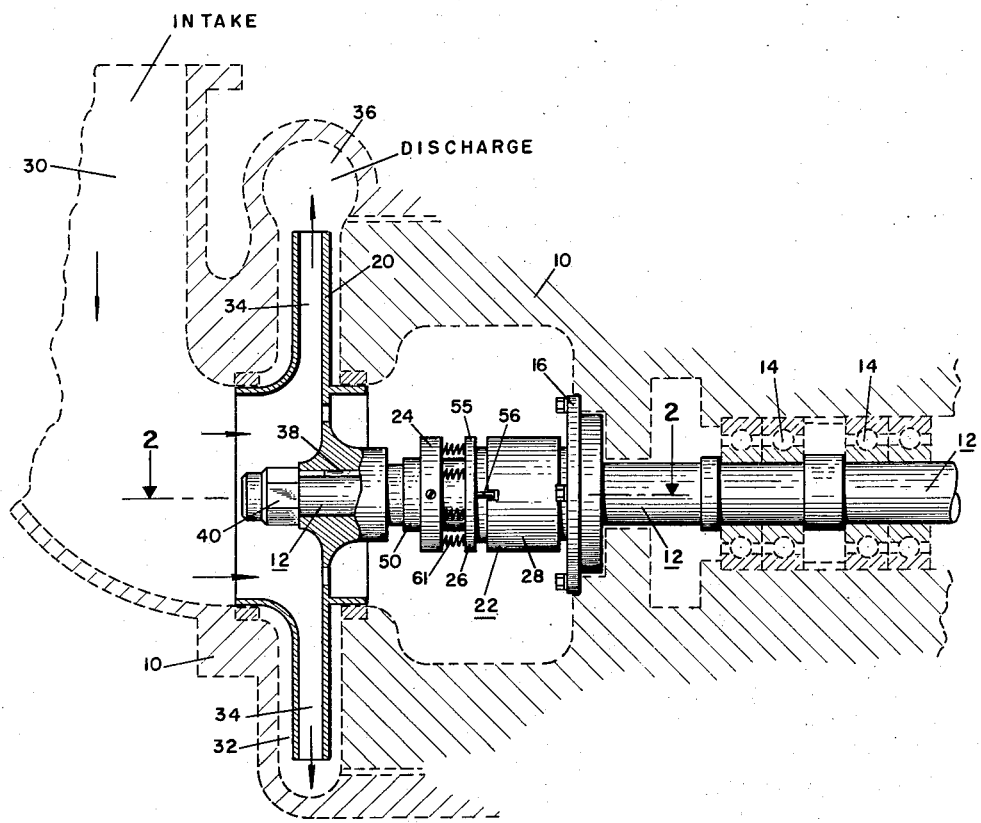
Fig. 1 is a vertical longitudinal cross-sectional view through the pump illustrating the improved packing.

Referring to the drawings, and more particularly to Figs. 1 and 2, a pump casing 10 is shown in which is installed a drive shaft 12. The drive shaft 12 extends into the casing 10 and is journalled for rotation in conventional ball bearings 14.

A stationary mechanical seal holder 16 is bolted to the inside of the pump casing 10. A stationary mechanical seal 18 is press-fitted into the stationary mechanical seal holder 16.

Assembled about the rotatable shaft 12 are an impeller 20 and rotatable packing means indicated generally by the numeral 22. The rotatable packing means includes a locking collar 24, a compression ring 26, and a rotatable cylindrical mechanical seal member 28.

An intake throat or conduit 30 is formed integrally with the casing 10 and opens coaxially into the side of the impeller chamber 32. The impeller 20 mounted within the impeller chamber 32 has formed therein a plurality of spoke-like, radially extending passages 34 which open axially at their inner ends to the intake conduit 30, and open radially at their outer ends to the discharge chamber 36, as is common in centrifugal pumps of this type.

A long key 38 drivingly connects the impeller 20 to the shaft, and a nut 40, threaded on the end of the shaft, clamps the impeller axially to the shaft.

Fig. 2 shows in detail the structure of the shaft and the packing. The shaft 12 consists of a smaller diameter portion 42 and a larger diameter portion 44. The larger diameter portion 44 extends from a point within the pump casing 10 to the shaft driving means (not shown) located outside of the pump casing. Thus, a circular shoulder 46 is formed on the shaft and within the casing.

The impeller 20 has a hub portion 48 extending along the smaller diameter portion 42 of the shaft.

A spacer sleeve 50 is mounted about the shaft. Spacer sleeve 50 is constructed to extend over a portion of the impeller hub 48 and also to extend over a portion of the larger diameter part 44 of the shaft 12. The spacer sleeve 50 has an internal ring portion 52 disposed between the hub 48 and the circular shoulder 46. Ring portion 52 extends inwardly substantially to the smaller diameter portion 42 of shaft 12.

Compression ring 26, having an outwardly extending collar 55, is mounted about the spacer sleeve 50. The compression ring 26 is connected to rotatable mechanical seal 28 by means of drive pin 56 mounted on collar 55 and extending into a recess 57 formed in rotatable mechanical seal 28.

The cylindrical mechanical seal 28 has its inside step-cut to form different inside diameter portions within seal 28 as indicated by numerals 58, 59, and 60. Portions 58, 59, and 60 have substantially the same inside diameters as the outside diameters of portion 44 of shaft 12, sleeve 50, and compression ring 26, respectively.

Locking collar 24 is also mounted about the sleeve member 50. Compression springs 61 are disposed in hollowed-out portions 62 of the locking collar 58. The compression springs 61 are mounted about compression spring pins 64 connected to the compression ring 26.

After the packing means, including the sleeve 50, locking collar 24, compression ring 26 and rotatable mechanical seal 28 have been assembled about the shaft, the locking collar 24 is advanced a certain amount, say ⅛ inch, to compress the springs 61 to apply the desired compression of the rotatable mechanical seal member 28 against the stationary mechanical seal member 18. For this purpose, the locking collar 24 is made separate from the sleeve member 50 and is movable axially with respect to the shaft and sleeve member to adjust for changes in the desired compression.

A gasket 66 is provided between the end of the impeller hub 48 and the circular spacer ring 52 to provide fluid-tight engagement between the spacer and the hub. Chevron packing 70 is provided between the rotatable mechanical seal member 28 and the compression ring 26 to provide fluid-tight engagement of these two members. Rotatable mechanical seal member 28 makes fluid-tight contact with circular protuberance 71 of stationary mechanical seal 18.

Fig. 5 shows the new sealing arrangement for use with an unbalanced type centrifugal pump. Instead of a sleeve type spacer, as is shown in Fig. 2, a ring-like spacer member 80 is utilized to separate the hub 48 from the circular shoulder 46. The locking collar 24, therefore, is moved axially, if desired, along the hub 48 to adjust the compression.

A single step-cut 81 is provided in the rotatable mechanical sealing member 82. The inside perimeter of the mechanical sealing member 82 and the chevron packing 70 are flush against the outside perimeter of the larger portion 44 of the shaft.

Stationary insert 84 includes a protuberance 86 having its outside perimeter the same as the outside perimeter of rotatable mechanical seal 82.

As formerly stated, the packing arrangement shown in Fig. 2 is used for a balanced type or high pressure pump, whereas the packing shown in Fig. 5 is used with an unbalanced type or lower pressure pump.

In both of the embodiments shown in Figs. 2 and 5, the spacer members are held firmly against the shaft shoulder by the nut 40 so that the spacer member, as well as the locking collar, compression ring, and rotatable mechanical seal rotate along with the shaft.

The spacer members and the sealing members can be made as standard parts and obtained from local mechanical seal supply houses.

The unbalanced or low pressure packing shown in Fig. 5 may be easily converted into the balanced or high pressure packing of Fig. 2 simply by exchanging the sleeve 50 of Fig. 2 for the sleeve 80 of Fig. 5 and the rotatable mechanical seal member 28 for the rotatable mechanical seal member 82.

The compression of the rotatable mechanical seal member against the stationary seal member can be easily adjusted simply by unscrewing the set screws 88 and moving the locking collar in the appropriate axial direction. The mechanical seal is independent of the location of the spacer ring.

Although specific embodiments of our invention have been described, it is to be understood that various modifications may be made without departing from the scope of the claims.

We claim:

1. In a centrifugal pump: a pump casing; an impeller drive shaft extending into the pump casing, said shaft having a smaller diameter portion, and a larger diameter portion extending from a point within the pump casing to outside the pump casing thus forming a circular shoulder within the casing; a spacer member and an impeller mounted about the smaller diameter portion of the shaft, the spacer member abutting said circular shoulder; sealing means disposed so as to prevent the passage of fluid between said spacer member and impeller; a rotatable mechanical seal member mounted about the larger diameter portion of said shaft; a stationary mechanical seal member mounted on the pump casing; a compression ring mounted about the spacer member and connected to the rotatable mechanical seal member; sealing means disposed so as to prevent the passage of fluid between the compression ring and the rotatable mechanical seal member; a collar mounted about the shaft and spaced from the compression ring and movable axially along said shaft; a plurality of compression springs mounted within the collar and acting against the compression ring causing the rotatable mechanical seal member to be pressed against the stationary mechanical seal member in fluid-tight engagement; and at least one set screw in the collar for locking the collar in a position to be driven by the impeller and in any desired position axially along the shaft, whereby the adjustment of the axial position of said collar on said shaft adjusts the compression of the rotatable mechanical seal member against said stationary mechanical seal member.

2. In a centrifugal pump: a pump casing; an impeller drive shaft extending into the pump casing, said shaft having a smaller diameter portion, and a larger diameter portion extending from a point within the pump casing to outside the pump casing thus forming a circular shoulder within the casing; a spacer ring and an impeller having a hub mounted about the smaller diameter portion of the shaft with the spacer ring abutting the circular shoulder, said spacer ring and hub having an outside diameter substantially the same as the diameter of the larger diameter portion of the shaft; sealing means disposed so as to prevent the passage of fluid between said spacer member and impeller; a rotatable mechanical seal member mounted about the larger diameter portion of said shaft; a stationary mechanical seal member mounted on the pump casing; a compression ring mounted about the spacer member and connected to the rotatable mechanical seal member; sealing means disposed so as to prevent the passage of fluid between the compression ring and the rotatable mechanical seal member; a collar mounted about the hub portion of the impeller and spaced from the compression ring and movable axially along the shaft; a plurality of compression springs mounted within the collar and acting against the compression ring causing the rotatable mechanical seal member to be pressed against the stationary mechanical seal member in fluid-tight engagement; and at least one set screw in the collar for locking the collar to the impeller hub and in any desired position axially along the shaft.

3. In a centrifugal pump: a pump casing; an impeller drive shaft extending into the pump casing, said shaft having a smaller diameter portion, and a larger diameter portion extending from a point within the pump casing to outside the pump casing thus forming a circular shoulder within the casing; an impeller having a hub portion mounted about the smaller diameter portion of the shaft; a spacer sleeve mounted about said impeller hub and extending over a portion of the larger diameter portion of the shaft, said spacer sleeve having a ring portion disposed between the hub and the circular shoulder; sealing means disposed so as to prevent the passage of fluid between said spacer member and impeller; a rotatable mechanical seal member mounted about the larger diameter portion of said shaft; a stationary mechanical seal member mounted on the pump casing; a compression ring mounted about the spacer member and connected to the rotatable mechanical seal member; sealing means disposed so as to prevent the passage of fluid between the compression ring and the rotatable mechanical seal member; a collar mounted about the sleeve spacer and spaced from the compression ring and movable axially along said sleeve; a plurality of compression springs mounted within the collar and acting against the compression ring causing the rotatable mechanical seal member to be pressed against the stationary mechanical seal member in fluid-tight engagement; and at least one set screw in the collar for locking the collar to that portion of the spacer sleeve mounted about the impeller hub so that the collar is driven thereby and the collar can be moved to any desired position axially along the shaft.

References Cited in the file of this patent

UNITED STATES PATENTS

| | | |
|---|---|---|
| 2,362,436 | Stratford | Nov. 7, 1944 |
| 2,395,705 | Wool | Feb. 26, 1946 |
| 2,741,991 | Disbrow | Apr. 17, 1956 |
| 2,824,759 | Tracy | Feb. 25, 1958 |

FOREIGN PATENTS

| | | |
|---|---|---|
| 545,594 | Italy | July 3, 1956 |

OTHER REFERENCES

Publication: Ingersoll-Rand "Cameron Shaft Seals," 10 pages.